United States Patent
Nagano et al.

(10) Patent No.: US 6,188,653 B1
(45) Date of Patent: Feb. 13, 2001

(54) OPTICAL STORAGE MEDIUM AND APPARATUS AND METHOD OF REPRODUCING DATA THEREFROM USING DIFFERENT LASER POWER

(75) Inventors: Hirofumi Nagano, Yokohama; Hideharu Eguchi, Yokosuka, both of (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/054,523

(22) Filed: Apr. 3, 1998

(30) Foreign Application Priority Data

Apr. 4, 1997 (JP) .................................................. 9-102513

(51) Int. Cl.$^7$ .......................................................... G11B 7/00
(52) U.S. Cl. ................................. 369/47; 369/54; 369/121
(58) Field of Search .................................. 369/32, 44.26, 369/44.32, 47, 44.37, 121, 116, 58, 54

(56) References Cited

U.S. PATENT DOCUMENTS

| | | | |
|---|---|---|---|
| 4,996,089 | * 2/1991 | Saito et al. | 369/288 |
| 5,161,137 | * 11/1992 | Suzuki | 369/32 |
| 5,163,033 | * 11/1992 | Yanagi | 369/32 |
| 5,235,582 | * 8/1993 | Taniguchi et al. | 369/44.26 |
| 5,398,223 | * 3/1995 | Tsujioka et al. | 369/47 |
| 5,400,402 | 3/1995 | Garfinkle . | |
| 5,469,418 | * 11/1995 | Satoh et al. | 369/32 |
| 5,493,548 | * 2/1996 | Kamioka | 369/84 |
| 5,852,595 | * 12/1998 | Matsui | 369/32 |

FOREIGN PATENT DOCUMENTS

| | | | |
|---|---|---|---|
| 4433868 | 5/1995 | (DE) . | |
| 2305339 | 4/1997 | (GB) . | |
| 0515219 | 11/1992 | (JP) . | |
| 05274364 | 10/1993 | (JP) . | |
| 408221948 | * 8/1996 | (JP) | 369/32 |

\* cited by examiner

*Primary Examiner*—Nabil Hindi
(74) *Attorney, Agent, or Firm*—Jacobson, Price, Holman & Stern, PLLC

(57) ABSTRACT

A first laser beam and a second laser beam are selectively generated. The first or the second laser beam is irradiated on an optical storage medium having a recording layer on which main data has been recorded. The main data includes data to be reproduced and reproduction management data. The laser beam selection is made according to the reproduction management data. The first laser beam has a first laser power capable of carrying the main data without erasing when reflected from the optical storage medium. On the other hand, the second laser beam has a second laser power capable of erasing the main data from the optical storage medium while carrying the main data when reflected from the optical storage medium. The data to be reproduced and carried by the first or the second laser beam is then reproduced.

26 Claims, 3 Drawing Sheets

OPTICAL STORAGE MEDIUM AND APPARATUS AND METHOD OF REPRODUCING DATA THEREFROM USING DIFFERENT LASER POWER

BACKGROUND OF THE INVENTION

The present invention relates to an optical data recording and reproducing apparatus and a method thereof, and an optical storage medium, such as a CD (Compact Disc) and DVD (Digital Video Disc, Digital Versatile Disc) for storing data which are recorded and reproduced by the apparatus and method.

Phase-change recording to record signals on optical storage media such as PDs and DVD-RAMs employs a laser beam that is irradiated on each optical storage medium to change a state of a recording layer of the optical storage medium from an amorphous state to a crystalline state and vise-versa.

Such phase-change recording type optical storage media are in the amorphous state just after layer formation. The amorphous state exhibits a low reflectivity as shown in FIG. 1 and hence a problem lies in picking up the laser beam reflected from the recording layer.

In order to solve the problem, a laser beam is irradiated on the optical storage media to raise a temperature of the recording layer to a temperature Tx at which the recording layer is in the crystalline state. The irradiation changes the recording layer from the amorphous state to the crystalline state that exhibits a high reflectivity as shown in FIG. 1 with no difficulty in picking up the reflected laser beam.

The laser beam is again irradiated on the optical storage media to raise a temperature of the recording laser higher than a temperature Tmp at which the recording layer is in the amorphous state. The irradiation changes the recording layer from the crystalline state to the amorphous state.

As described above, the laser beam is controlled in signal recording so that it exhibits a bottom power to raise the temperature of the recording layer high than the temperature Tx and a peak power to raise the temperature of the recording layer higher than the temperature Tmp.

FIG. 2 illustrates a recording layer of a phase-change recording type optical storage medium D with pits P in the amorphous state while the other portions C in the crystalline state. This amorphous-crystalline state combination enables new signal over-writing on the storage medium D on which other signals have already been recorded.

Reproduction of the recorded signals is done by controlling the laser beam to decrease the temperature of the recording layer lower than the temperature Tx, the laser beam being irradiated on the recording layer and reflected therefrom.

The phase-change recording type rewritable optical storage media with large storage capacity as described above are highly applicable to data communications via optical fibers of high transfer rate and satellites, for example.

Such optical storage media are particularly applicable, for instance, to pay-per-view type video-on-demand service. Under the service, data, for example, containing many movies are compressed and transferred to users and recorded on the user's optical storage medium. Each user pay fees only for the movies they have watched among the recorded many movies.

However, under such service, a software such as a movie that has expired the term for use should be erased from the user's optical storage medium in order to protect copyright of the software.

SUMMARY OF THE INVENTION

A purpose of the present invention is to provide an optical data recording and reproducing apparatus and a method thereof capable of erasing signals while reproducing the signals from an optical storage medium.

Another purpose of the present invention is to provide an optical storage medium on and from which signals are recorded and reproduced by the apparatus and method.

The present invention provides an optical data processing apparatus comprising: an optical pick-up to selectively generate and irradiate a first laser beam and a second laser beam on an optical storage medium having a recording layer on which main data has been recorded, the main data including data to be reproduced and reproduction management data, the laser beam selection being made according to the reproduction management data, the first laser beam having a first laser power capable of carrying (reproducing) the main data without erasing when reflected from the optical storage medium and the second laser beam having a second laser power capable of erasing the main data from the optical storage medium while carrying (reproducing) the main data when reflected from the optical storage medium; and a reproducer to reproduce the data to be reproduced carried by the first or the second laser beam.

Further, the present invention provides a method of data processing comprising the steps of: selectively generating a first laser beam and a second laser beam; irradiating the first or the second laser beam on an optical storage medium having a recording layer on which main data has been recorded, the main data including data to be reproduced and reproduction management data, the laser beam selection being made according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium; and reproducing the data to be reproduced carried by the first or the second laser beam.

Further, the present invention provides an optical storage medium having a layer for storing main data including data to be reproduced and reproduction management data, in reproduction of the main data, a first laser beam or a second laser beam being irradiated on the optical storage medium according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium.

DETAILED DESCRIPTION OF PREFERRED EMBODIMENT

A preferred embodiment according to the present invention will be described with reference to the attached drawings.

Figure 3:
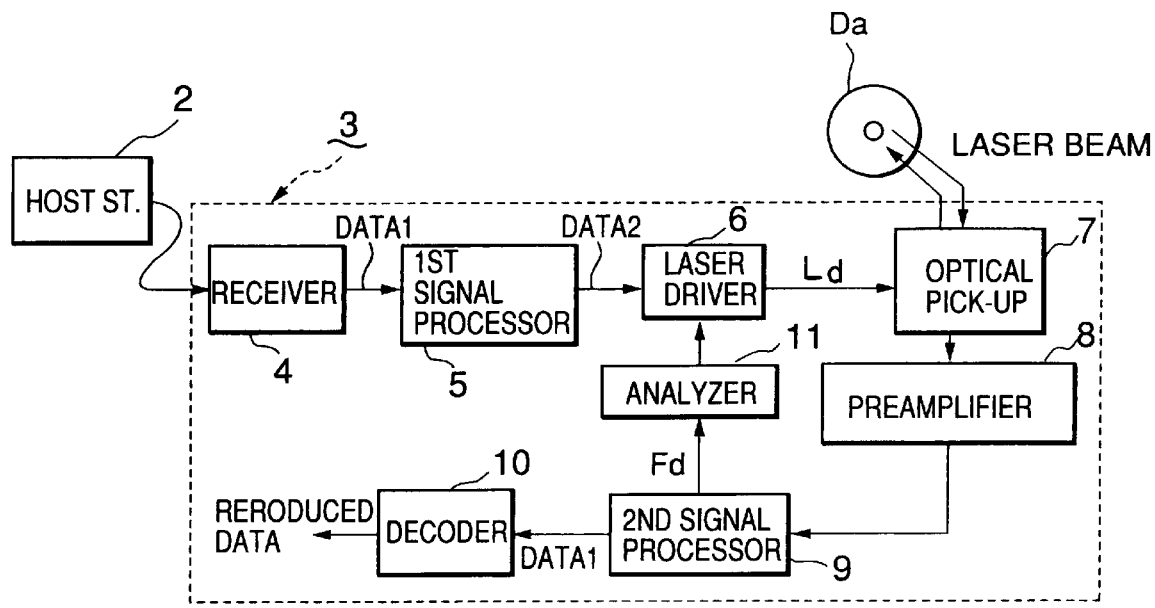
FIG. 3 is a block diagram of an optical data recording and reproducing apparatus according to the present invention.

In FIG. 3, data containing software such as movies are transferred from a host station 2 to a user's optical data recording and reproducing apparatus 3 according to the present invention via a satellite, a communications cable, etc. The data are then supplied to a receiver 4 such as a modem.

The data have been compressed by a compression method such as EMEG2 (Moving Picture Experts Group 2) if including video data. The data further include flag data Fd for protecting copyright that indicates the allowable number of reproduction time, the allowable term for use during which a user can freely reproduce the video data, identification (ID) data for identifying each user, and so on.

The receiver 4 outputs and supplies data 1 to a first signal processor 5 that applies modulation and error correction to the data 1 to generate data 2 that are to be recorded on a phase-change recording type rewritable optical storage medium (disc) Da.

The data 2 are supplied to a laser driver 6 that applies a signal processing to the data 2 to generate a laser driving signal Ld.

The laser driving signal Ld is supplied to an optical pick-up 7 that irradiates a laser beam on the storage medium Da to record thereon the data 2.

Figure 1:
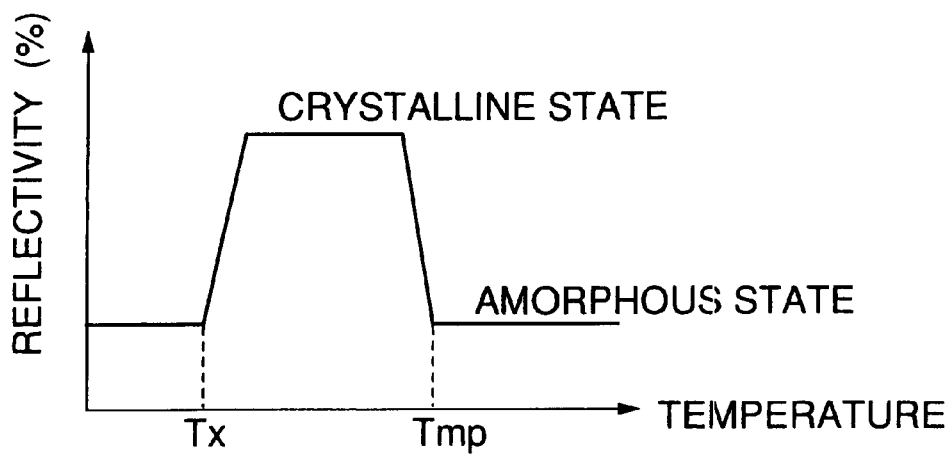
FIG. 1 is a graph showing the relationship between temperature and reflectivity during recording/reproduction.
Figure 2:
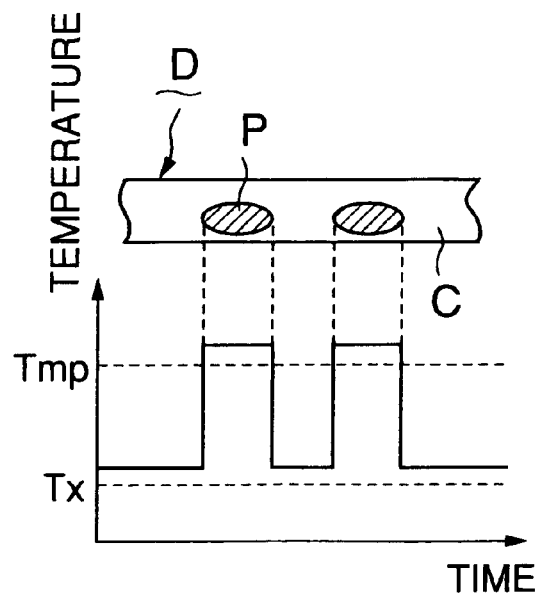
FIG. 2 illustrates a recording layer of an optical storage medium and a graph showing temperature control during recording.

The laser beam is controlled by the optical pick-up 7 to exhibit a bottom power to raise a temperature of a recording layer of the storage medium Da higher than the temperature Tx but lower than the temperature Tmp and a peak power to raise a temperature of the recording laser higher than the temperature Tmp. The temperatures Tx and Tmp are defined such that the recording layer is in the crystalline and amorphous states at the temperatures Tx and Tmp, respectively, the same as those described with reference to FIGS. 1 and 2.

In this embodiment, the recording layer of the optical storage medium Da is composed of germanium antimony telluride as a phase-change type material. For this material, the temperatures Tx and Tmp are about 400° C. and 650° C., respectively.

The optical pick-up 7 is capable of selectively emitting a first laser beam for reproducing the data stored in the optical storage medium Da without erasing and a second laser beam for erasing the stored data during reproduction. The optical pick-up 7 may have two laser emitting devices or one laser switching and emitting device for selective laser emission.

The data (main data) stored on the optical storage medium Da are then reproduced by the optical pick-up 7 and supplied to a preamplifier 8. The data processed by the preamplifier 8 are supplied to a second signal processor 9 that applies error correction to the data and separates the flag data Fd therefrom as reproduction management data.

The flag data Fd is supplied to an analyzer 11 that analyzes the flag data and determines whether the first or the second laser beam described above is used for reproduction.

The second signal processor 9 reproduces the data 1 that are supplied to a decoder 10 that decodes the software transferred from the host station 2.

Here, reproduction may be conducted with the laser power of raising the temperature of the recording layer of the optical storage medium Da higher than the temperature Tx.

Figure 4:
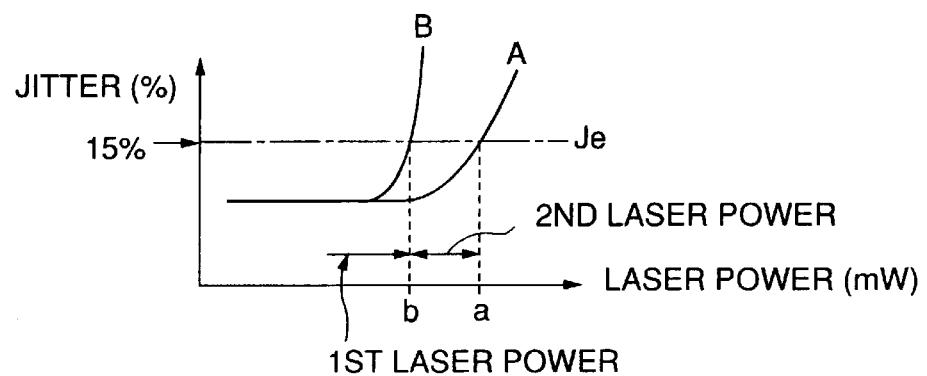
FIG. 4 is a graph showing the relationship between laser power and jitter.

FIG. 4 shows the result of experiment on laser power in that how much laser power can be applied to the reproduction. The vertical and horizontal lines in FIG. 4 indicate jitter caused on the reproduced signals and reproducing laser power continuously irradiated on the optical storage medium Da, respectively.

A curve "A" indicates jitter caused by irradiating the continuous laser on the optical storage medium Da, thus the temperature of the recording layer of the optical storage medium Da going beyond the temperature Tx. On other hand, a curve "B" indicates jitter caused by the normal laser power with no increase in temperature of the recording layer beyond the temperature Tx after the continuous laser beam irradiation.

A straight broken line $J_1$ indicates a reproduction limit jitter (15%). A laser power that causes jitter over the reproduction limit jitter $J_1$ will increase in reproduction block error with the result in that reproduction will be impossible, or the data will be erased from the optical storage medium Da.

FIG. 4 teaches that a laser power exhibiting the characteristics curve "A" until a point "a" is capable of reproduction, and another laser power exhibiting the characteristics curve "B" over a point "b" is capable of erasing during reproduction, thus the next reproduction being impossible.

Therefore, a laser power between the points "b" and "a" achieves reproduction while erasing at the same time. The laser beam with this power is the second laser beam described above. And, the laser beam with a power less than the point "b" is the first laser beam also described above. The first laser beam is employed by conventional optical data recording and reproducing apparatus.

In FIG. 3, the laser driving signal Ld supplied from the laser driver 6 to the optical pick-up 7 is a direct current and the laser power selectively emitted therefrom is constant. Here, the first laser beam to raise the temperature of the recording layer of the optical storage medium Da but below the temperature Tx is selected if the reproduction is still allowed under the copyright of software.

Whether the reproduction is still allowable is determined by analyzing the flag data Fd by the analyzer 11 as described above.

If the flag data indicates the allowable number of reproduction time, such as 5 times, the analyzer 11 updates the flag data Fd by subtracting "1" from the present flag data Fd after the completion of reproduction.

On the other hand, if the flag data Fd indicates the allowable term for use, the analyzer 11 calculates the remaining term with comparison of the date pre-set in the optical data recording and reproducing apparatus 3 and updated every day with the expiring date indicated by the allowable term for use. For example, if the allowable term for use is one year, the second laser beam will be firstly used after one year passes since the data is transferred from the host station 2 and recorded on the optical storage medium Da.

Further, if the flag data Fd indicates the ID data, the analyzer 11 compares the ID data and another ID data entered by a user via an ID data input means such as a keyboard (not shown) to the optical data recording and reproducing apparatus 3.

Figure 5:
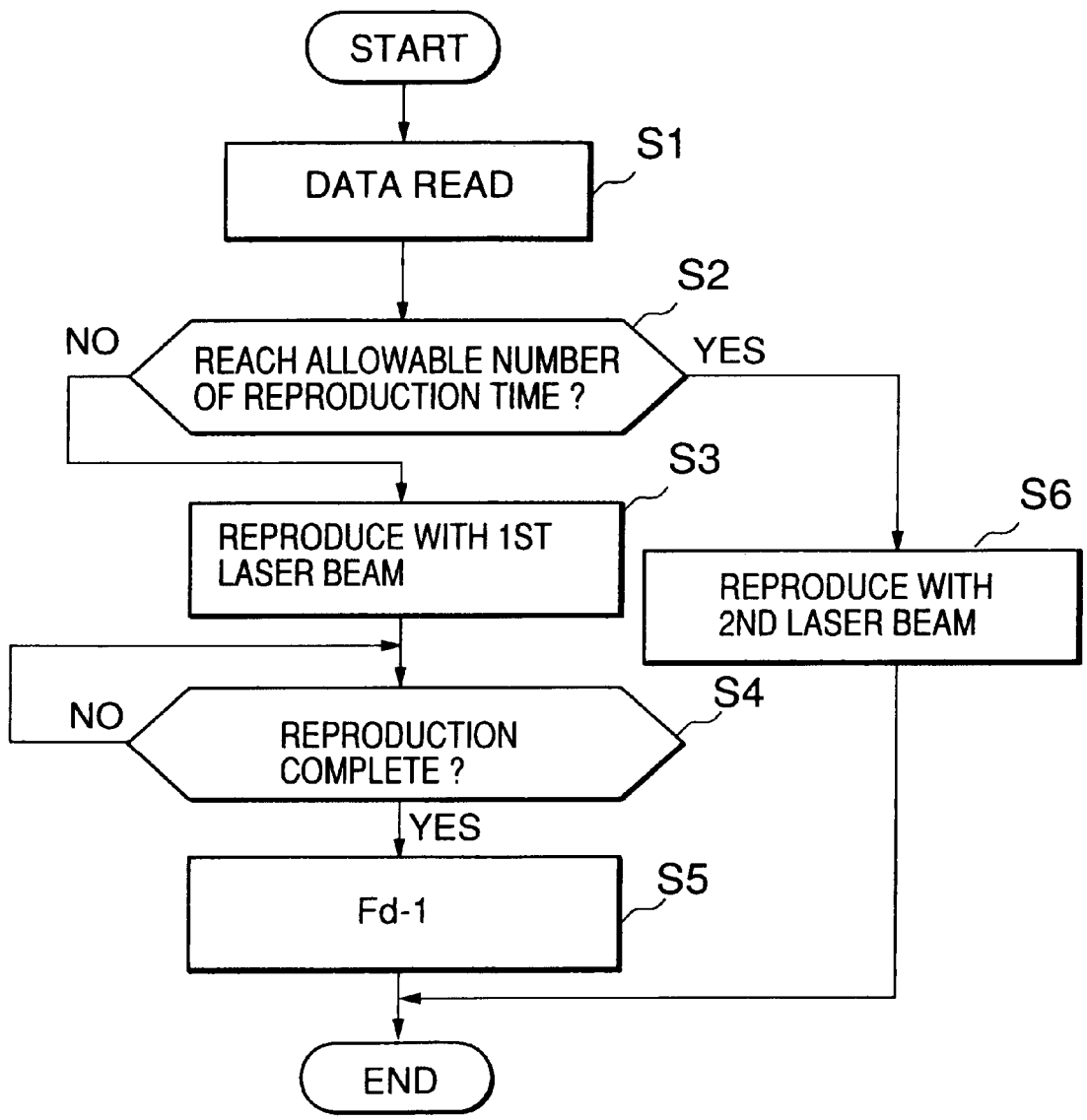
FIG. 5 is a flow chart explaining an operation of the optical data recording and reproducing apparatus shown in FIG. 3.

The selection of laser beam with flag data analyses is further described with reference to a flow chart shown in FIG. 5 in the case where the flag data Fd indicates the allowable number of reproduction time.

On reproduction, the first laser beam is irradiated on the optical storage medium Da to read the data in step S1.

The flag data Fd is separated from the read data by the second signal processor 9 and analyzed by the analyzer 11 whether the current number of reproduction time reaches the allowable number of reproduction time in step S2.

If the current number of reproduction time still not reach the allowable number of reproduction time, the analyzer 11 supplies a first command signal to the laser driver 6 to drive the optical pick-up 7 to generate the first laser beam for reproduction in step S3.

If the reproduction is complete in step S4, the analyzer 11 updates the flag data Fd by subtracting "1" from the allowable number of reproduction time indicated by the flag data in step S5 and the process ends. The data is still stored in the optical storage medium Da.

On the other hand, if the current reproduction time reaches the allowable number of reproduction time in step S2, the analyzer 11 supplies a second command signal to the laser driver 6 to drive the optical pick-up 7 to generate the second laser beam for reproduction in step S6 and the process ends. If the reproduction with the second laser beam is complete, the data is erased from the optical storage medium Da.

The allowable number of reproduction time and term for use, and ID data are described in the embodiment, however, not limited to those, any other applicable data can be used as the flag data Fd in the invention.

As described above, according to the present invention, the optical data recording and reproducing apparatus with selective emission of the first and second laser beams with different laser power achieves reproduction with or without erasing the data stored on an optical storage medium.

What is claimed is:

1. An optical data processing apparatus comprising:
   an optical pick-up to selectively generate and irradiate a first laser beam and a second laser beam on a phase-change recording type optical storage medium having a recording layer on which main data and reproduction management data have been recorded, the laser beam selection being made according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium, the first laser power raising a temperature of the recording layer but below a first temperature at which the recording layer is in an amorphous state, the second power being raising a temperature of the recording layer higher than the first temperature but below a second temperature that is higher than the first temperature and is a specific max temperature beyond which reproduction of the main data is impossible;
   an analyzer to analyze the reproduction management data carried by the first or the second laser beam to determine whether the first or the second laser beam is generated and supplies a command signal to the optical pickup, the optical pickup thus generating the first or the second laser beam in response to the command signal; and
   a reproducer to reproduce the data to be reproduced carried by the first or the second laser beam.

2. The apparatus according to claim 1, wherein the reproduction management data indicates a first data which is updated periodically, when the updated first data reaches a second predetermined data, the analyzer supplies a command signal to the optical pick-up to generate the second laser beam.

3. The apparatus according to claim 2, wherein, while the updated first data does not reach the second predetermined data, the analyzer supplies another command signal to the optical pick-up to generate the first laser beam.

4. The apparatus according to claim 2, wherein the first and the second data indicate different numbers of reproduction time.

5. The apparatus according to claim 1, wherein the reproduction management data indicates a first predetermined data, when the first predetermined data is identical to a second data which is updated periodically, the analyzer supplies a command signal to the optical pickup to generate the second laser beam.

6. The apparatus according to claim 5, while the first predetermined data is not identical to the second data, the analyzer supplies another command signal to the optical pick-up to generate the first laser beam.

7. The apparatus according to claim 5, wherein the first predetermined data indicates an expiring date of the data to be reproduced and the second data indicates a current date.

8. The apparatus according to claim 1, wherein the reproduction management data indicates a first identification data and when the first identification data is not identical to a second identification data entered to the optical data processor, the analyzer supplies a command signal to the optical pick-up to generate the second laser beam.

9. The apparatus according to claim 8, when the first identification data is identical to the second identification data, the analyzer supplies another command signal to the optical pick-up to generate the first laser beam.

10. A method of data processing comprising the steps of:
    selectively generating a first laser beam and a second laser beam;
    irradiating the first or the second laser beam on a phase-change recording type optical storage medium having a recording layer on which main data and reproduction management data have been recorded, the laser beam selection being made according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium, the first laser power raising a temperature of the recording layer so that the recording layer is in an amorphous state, the second power for raising a temperature of the recording layer higher than the first temperature but below a second temperature that is higher than the first temperature and is a specific max temperature beyond which reproduction of the main data is impossible;
    analyzing the reproduction management data carried by the first or the second laser beam to determine whether the first or the second laser beam is generated, the first or the second laser beam being generated in response to the analysis of the reproduction management data; and
    reproducing the data to be reproduced carried by the first or the second laser beam.

11. The method according to claim 10, wherein the reproduction management data indicates a first data which is updated periodically, the analyzing step comprising the step of determining whether the updated first data reaches a second predetermined data, if reached, the second laser beam being generated.

12. The method according to claim 11, wherein, while the updated first data does not reach the second predetermined data, the first laser beam is generated.

13. The method according to claim 11, wherein the first and the second data indicate different numbers of reproduction time.

14. The method according to claim 10, wherein the reproduction management data indicates a first predetermined data, the analyzing step comprising the step of determining whether the first predetermined data is identical to a second data which is updated periodically, if identical, the second laser beam being generated.

15. The method according to claim 14, while the first predetermined data is not identical to the second data, the first laser beam is generated.

16. The method according to claim 14, wherein the first predetermined data indicates an expiring date of the data to be reproduced and the second data indicates a current date.

17. The method according to claim 10, wherein the reproduction management data indicates a first identification data, the analyzing step comprising the step of determining whether the first identification data is not identical to a second identification data entered to the optical data processor, if not, the second laser beam being generated.

18. The method according to claim 17, when the first identification data is identical to the second identification data, the first laser beam is generated.

19. A phase-change recording type optical storage medium having a recording layer for storing main data and reproduction management data that indicates a first data which is updated periodically, arrival of the updated first data at a second predetermined data indicating generation of the second laser beam, in reproduction of the main data, a first laser beam or a second laser beam being irradiated on the optical storage medium according to the reproduction management data, the first laser beam having a first laser power capable of carrying the main data without erasing when reflected from the optical storage medium and the second laser beam having a second laser power capable of erasing the main data while carrying the main data when reflected from the optical storage medium, the first laser beam having a first laser power raising a temperature of the recording layer but below a first temperature at which the recording layer is in an amorphous state, the second power for raising a temperature of the recording layer higher than the first temperature but below a second temperature that is higher than the first temperature and is a specific max temperature beyond which reproduction of the main data is impossible.

20. The storage medium according to claim 19, wherein non-arrival of the updated first data at the second predetermined data indicates generation of the first laser beam.

21. The storage medium according to claim 19, wherein the first and the second data indicate different numbers of reproduction time.

22. A phase-change recording type optical storage medium having a recording layer for storing main data and reproduction management data that indicates a first predetermined data, arrival of a second data which is updated periodically at the first predetermined data indicating generation of the second laser beam, in reproduction of the main data, a first laser beam or a second laser beam being irradiated on the optical storage medium according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium, the first laser beam having a first laser power raising a temperature of the recording layer but below a first temperature at which the recording layer is in an amorphous state, the second power for raising a temperature of the recording layer higher than the first temperature but below a second temperature that is higher than the first temperature and is a specific max temperature beyond which reproduction of the main data is impossible.

23. A phase-change recording type optical storage medium having a recording layer for storing main data and reproduction management data that indicates a first identification data, disagreement of the first identification data with a second entered identification data indicating generation of the second laser beam, in reproduction of the main data, a first laser beam or a second laser beam being irradiated on the optical storage medium according to the reproduction management data, the first laser beam having a first laser power capable of carrying the main data without erasing when reflected from the optical storage medium and the second laser beam having a second laser power capable of erasing the main data from the optical storage medium while carrying the main data when reflected from the optical storage medium, the first laser beam having a first laser power raising a temperature of the recording layer but below a first temperature at which the recording layer is in an amorphous state, the second power for raising a temperature of the recording layer higher than the first temperature but below a second temperature that is higher than the first temperature and is a specific max temperature beyond which reproduction of the main data is impossible.

24. The storage medium according to claim 22, wherein non-arrival of the second data at the first predetermined data indicates generation of the first laser beam.

25. The storage medium according to claim 22, wherein the first predetermined data indicates an expiring date of the data to be reproduced and the second data indicates a current date.

26. The storage medium according to claim 23, wherein the agreement of the first identification data with the second entered identification data indicating generation of the first laser beam.

* * * * *